(12) United States Patent
Merlock

(10) Patent No.: US 11,291,168 B2
(45) Date of Patent: Apr. 5, 2022

(54) TILTING PLANT SHADE AND SELECTIVE FERTILIZER DISTRIBUTION DEVICE

(71) Applicant: Thomas Lawrence Merlock, Waukegan, IL (US)

(72) Inventor: Thomas Lawrence Merlock, Waukegan, IL (US)

( * ) Notice: Subject to any disclaimer, the term of this patent is extended or adjusted under 35 U.S.C. 154(b) by 112 days.

(21) Appl. No.: 16/994,351

(22) Filed: Aug. 14, 2020

(65) Prior Publication Data

US 2022/0046867 A1 Feb. 17, 2022

(51) Int. Cl.
*A01G 13/02* (2006.01)
*A01G 29/00* (2006.01)
*A01C 15/06* (2006.01)

(52) U.S. Cl.
CPC .......... *A01G 13/0212* (2013.01); *A01C 15/06* (2013.01)

(58) Field of Classification Search
CPC .... A01G 13/0212; A01G 29/00; A01G 13/00; A01G 13/02; A01G 13/0206; A01G 13/04
See application file for complete search history.

(56) References Cited

U.S. PATENT DOCUMENTS

| 3,345,774 | A | * | 10/1967 | Delbuguet | A01G 29/00 47/48.5 |
| 2008/0092440 | A1 | * | 4/2008 | Johnson | A01G 29/00 47/48.5 |
| 2010/0107488 | A1 | * | 5/2010 | King | A01G 13/0212 47/20.1 |
| 2014/0026475 | A1 | * | 1/2014 | Centeno | A01G 13/02 47/29.5 |

FOREIGN PATENT DOCUMENTS

| DE | 19700612 A1 | * | 7/1998 | A01G 29/00 |
| FR | 341443 A | * | 8/1904 | A01G 13/0212 |

* cited by examiner

*Primary Examiner* — Kristen C Hayes

(57) ABSTRACT

A device having a fertilizer base that is configured to be operable for distributing fertilizer to a surrounding soil. A collapsible or retractable umbrella is into engagement with the fertilizer base, wherein the umbrella is configured to provide shade for the plant. A bottom portion of a shaft section engages the fertilizer base and a top portion of the collapsible or retractable umbrella. The shaft section includes a tilting shaft that is operable to be tilted to provide partial or full shade to the plant proximal to the fertilizer base according to a sun's orientation or the plant's required amount of sunlight. An adapter coupling is configured to facilitate the engagement or separation of the shaft section with the fertilizer base and allow a user to add fertilizer to the cartridge area without uninstalling the device.

20 Claims, 12 Drawing Sheets

TILTING PLANT SHADE AND SELECTIVE FERTILIZER DISTRIBUTION DEVICE

CROSS-REFERENCE TO RELATED APPLICATIONS

Not applicable.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to gardening. More particularly, certain embodiments of the invention relate to a gardening utility device.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

By way of educational background, an aspect of the prior art generally useful to be aware of is that in many scenarios, fertilizer may have various benefits in home gardening. Many home gardens may not utilize fertilizer, or alternatively not use fertilizer consistently. Typically, soil does not provide all of the essential nutrients required for optimal growth, resulting in gardens yielding less flowers or produce than they should. Traditional approaches to fertilizing must be repeatedly applied to achieve maximum effectiveness and ensure that the soil contains the proper nutrients essential for growth.

Further, many different types of plants have varying needs in terms of sunlight exposure. Some plants require full sunlight, partial shade, or full shade. If a partial or full shade plant is placed in direct sunlight for extended periods of time, it may not grow optimally or, at the worst case, die. However, it may be difficult to always find an area to place a plant with the amount of sunlight required for optimal growth. It may also be desirable to place a plant that requires shade into an area with direct sunlight for aesthetic purposes.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
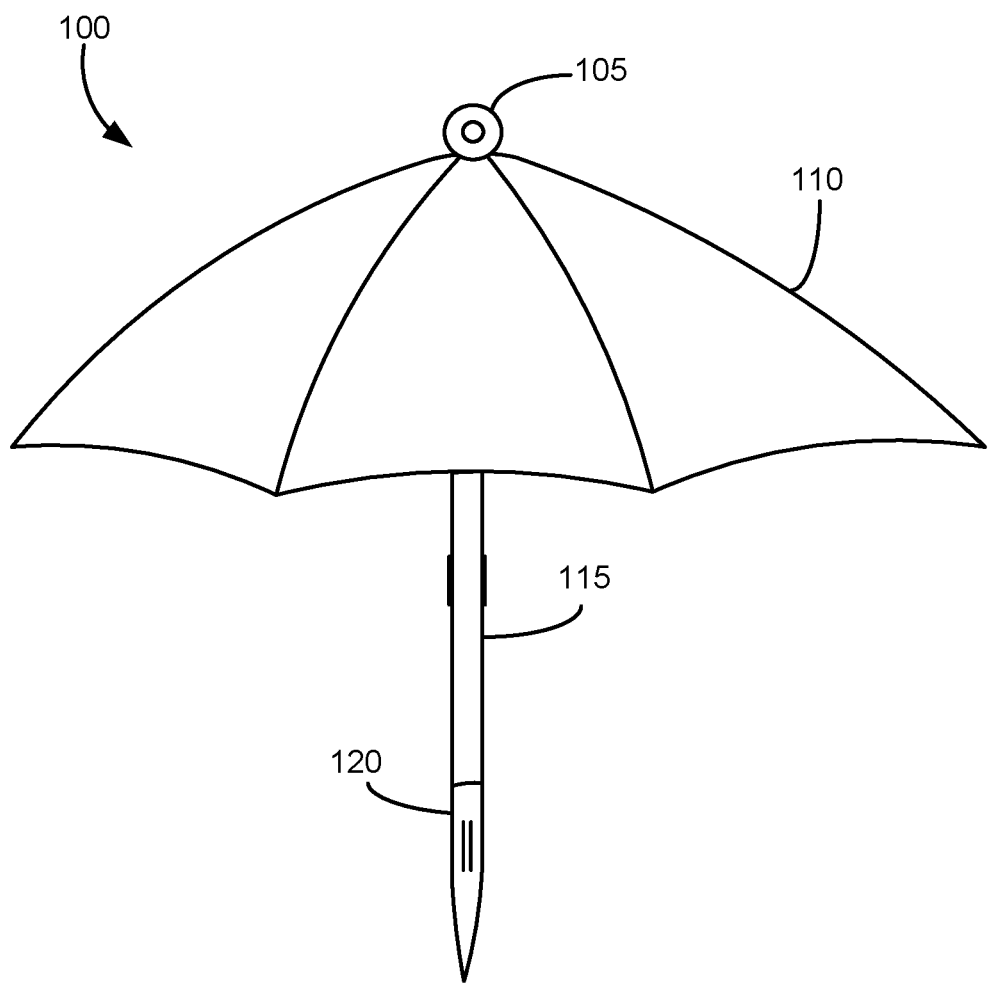
FIG. 1 is an illustration of an exemplary gardening utility device, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them— Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

The present invention will now be described in detail with reference to embodiments thereof as illustrated in the accompanying drawings.

FIG. 1 is an illustration of an exemplary gardening utility device, in accordance with an embodiment of the present invention. Gardening utility device 100 comprises finger pull 105, collapsible or retractable umbrella shade 110, shaft 115, and fertilizer base 120. Collapsible or retractable umbrella 110 may provide shade for a plant while the fertilizer base may provide nutrients to the plant. Finger pull 105 may be attached to the top of shaft 115 above collapsible/retractable umbrella shade 110, and gives the user leverage while installing and uninstalling gardening utility device 100. Additionally, finger pull 105 may be twisted clockwise to expand collapsible shade 110, and likewise may be twisted counterclockwise to collapse collapsible shade 110. Shade 110 can be pushed up manually as well or collapsed by manual depression of shaft 115 buttons. In one embodiment, collapsible/retractable umbrella shade 110 may be octagonal in shape, between 12"-36" in diameter, and made of a weather resistant and easily cleanable material such as polyester, vinyl or Teflon. However, as will be appreciated by one skilled in the art, collapsible shade 110 may be of any shape, such as, but not limited to, circular, ovular, rectagonal, etc., be of any diameter, and composed of any material such as, but not limited to, canvas, acrylic, olefin, etc. Shaft 115 may provide support for shade 110, and may be attached to finger pull 105 and shade 110 at its top, and fertilizer base 120 at its bottom. Further, shaft 115 may be telescopic to allow the user to adjust the height of the shade and store garden utility device 100 more conveniently. In another embodiment, shaft 115 may be conical in shape, between ⅜" and ½" in width, and may be composed of a sturdy, weather-resistant material such as aluminum. As will be appreciated by one skilled in the art, shaft 115 may be of any shape, such as, but not limited to, circular, rectangular, square-shaped, octagonal, etc., of any width, and of any material, such as, but not limited to, wood, steel, plastic, etc. Fertilizer base 120 may be attached or removed to the bottom of shaft 115, and may be inserted into the soil to both give stability to garden utility device 100 and deliver nutrients to the soil to aid in plant growth. In an embodiment, fertilizer base 120 may be composed of any sturdy, resistant material, such as steel. One skilled in the art will appreciate that fertilizer base 120 may be composed of any material, such as, but not limited to, aluminum, fiberglass, steel, plastic, wood, etc.

Figure 2:
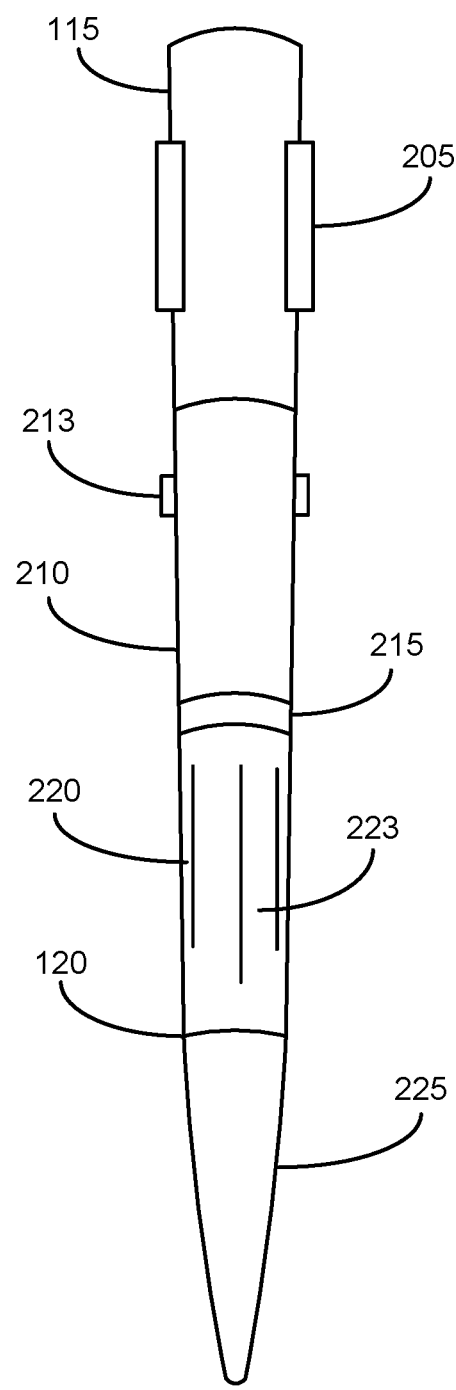
FIG. 2 is an illustration of a lower portion of an exemplary gardening utility device, in accordance with an embodiment of the present invention.

FIG. 2 is an illustration of a lower portion of an exemplary gardening utility device, in accordance with an embodiment of the present invention. Referring now to both FIG. 1 and FIG. 2, tilt button 205 is attached to shaft 115, and is used to tilt shaft 115 according to the needs of the user. For example, without limitation, shaft 115 may be tilted to provide partial or full shade to a plant proximal to its base according to the plant's required amount of sunlight. If additional height is needed, shaft height extension 210 may be attached between shaft 115 and fertilizer base 120. In an alternative embodiment, shaft 115 may comprise of a telescoping shaft. Shaft extension lock release button 213 provides a locking and releasing engagement of the shaft height extension or telescoping shaft. Threaded shaft area or threaded base portion 215 of fertilizer base 120 allows shaft 115 to generally be easily engaged and removed, and allows the user to add fertilizer to cartridge area 220 of fertilizer base 120 without needing to completely uninstall garden utility device 100. Fertilizer cartridge area 220 may be filled with fertilizer, and contains a plurality of slots 223 surrounding the cartridge area so that the fertilizer may be evenly distributed to the surrounding soil. The slots may be adjusted to different widths depending on the fertilizer to be used. For example, without limitation, finer grained or powdered fertilizer may require that slots 223 be smaller than coarser grained fertilizer where the individual granules are much larger. Stake 225 may be at the end of fertilizer base 120, and is pointed to allow the user to easily drive garden utility device 100 into the ground.

Figure 3:
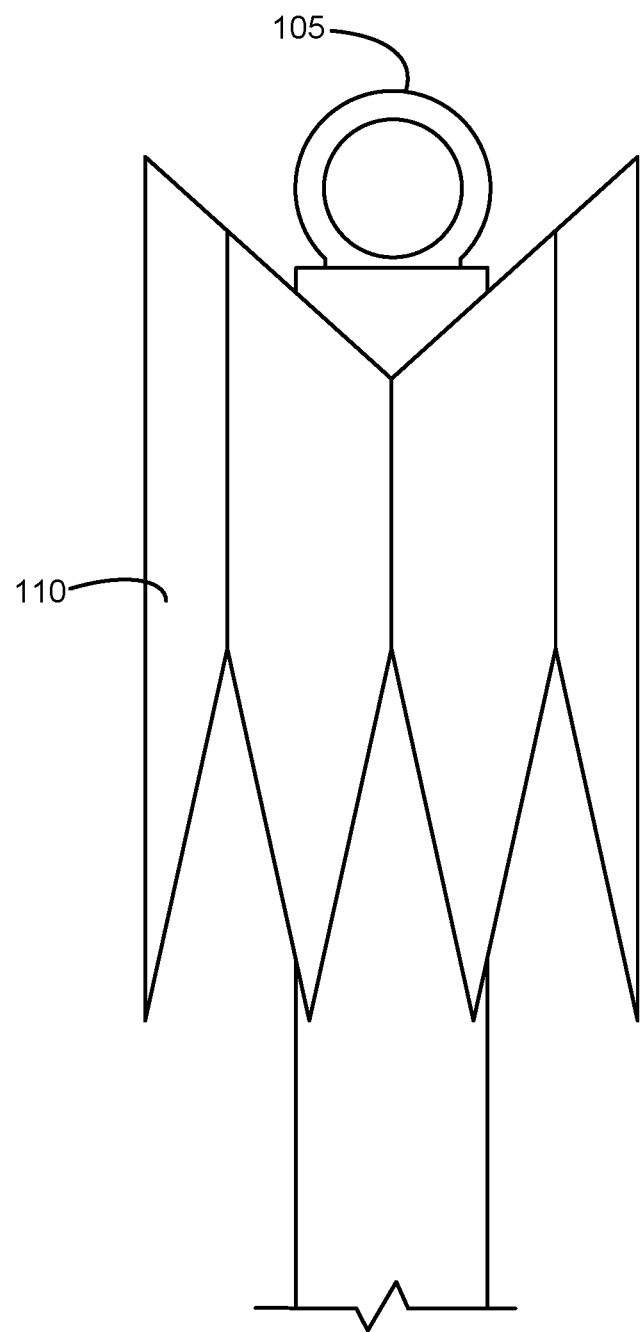
FIG. 3 is an illustration of an exemplary gardening utility device with umbrella collapsed, in accordance with an embodiment of the present invention.

FIG. 3 is an illustration of an exemplary gardening utility device with umbrella collapsed, in accordance with an embodiment of the present invention. Referring now to both FIG. 1 and FIG. 3, collapsible/retractable umbrella shade 110 may be collapsed to adjust the amount of shade provided and allow for easier storage of garden utility device 100. Finger pull 105 may be twisted clockwise to expand collapsible shade 110, and likewise may be twisted counter-clockwise to collapse collapsible shade 110. As shown, shade 110 both collapses and retracts downwards, allowing collapsible shade 110 to be as compact as possible.

Figure 4:
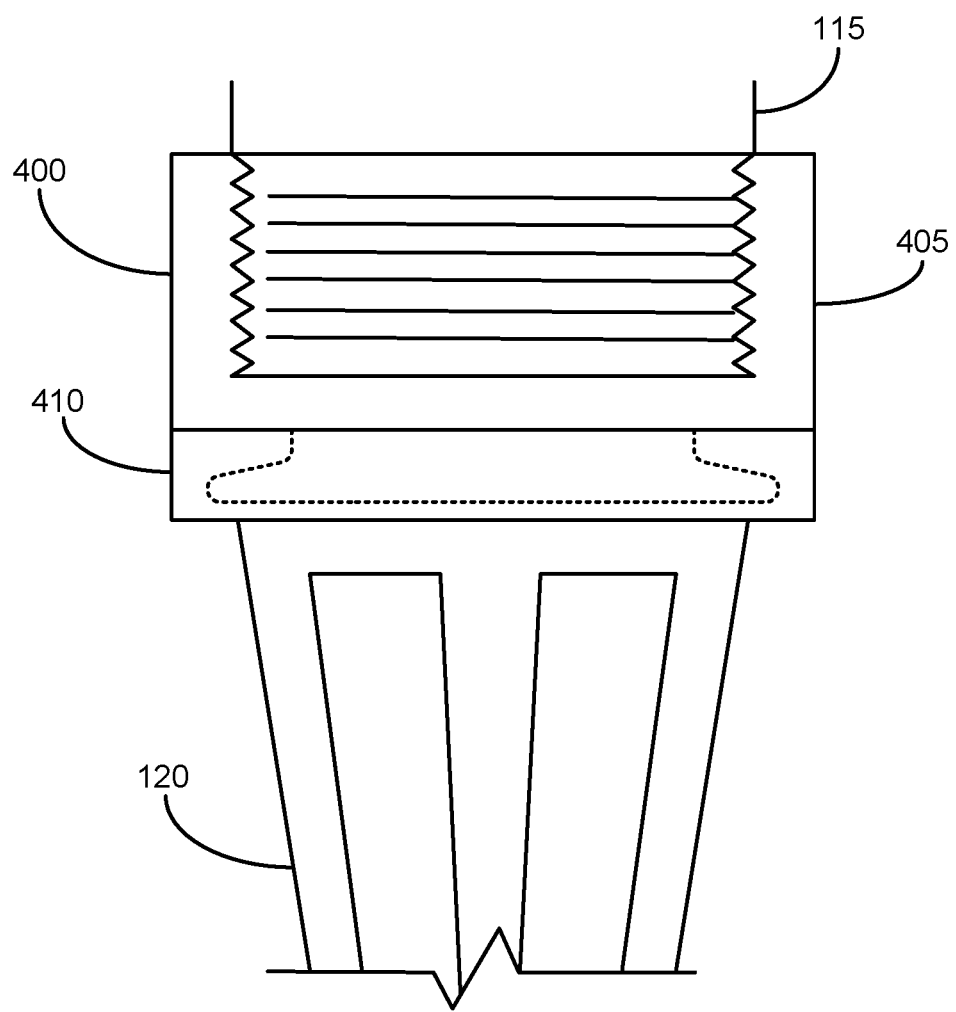
FIG. 4 is an illustration of an exemplary adapter coupling, in accordance with an embodiment of the present invention.

FIG. 4 is an illustration of an exemplary adapter coupling, in accordance with an embodiment of the present invention. Referring now to both FIG. 1 and FIG. 4, the adapter coupling 400 which facilitates the engagement and/or separation of shaft 115 and fertilizer base 120 and allows the user to add fertilizer to cartridge area 220 of fertilizer base 120 without needing to completely uninstall garden utility device 100. Adapter coupling 400 comprises top adapter 405, which attaches to shaft 115, and adapter shaft 410, which attaches to fertilizer base 120, as will be described in greater detail below with reference to FIGS. 5A-C.

Figure 5A:
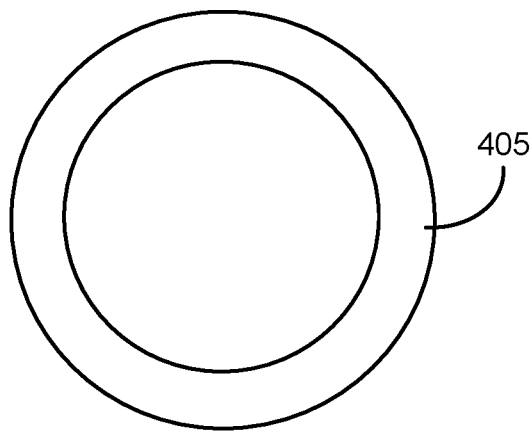
FIGS. 5A-C are illustrations of top, side, and bottom views, respectively, of an exemplary adapter coupling, in accordance with an embodiment of the present invention.
Figure 5B:
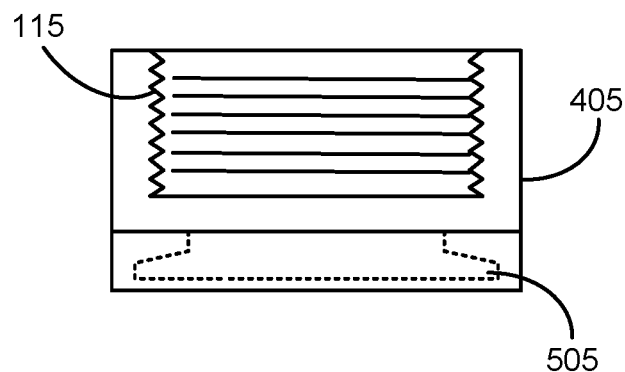
Figure 5C:
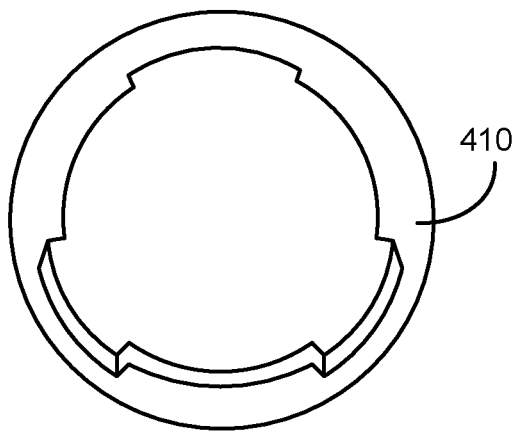

FIGS. 5A-C are illustrations of top, side, and bottom views, respectively, of an exemplary adapter coupling, in accordance with an embodiment of the present invention. Referring now to both FIG. 4 and FIG. 5A, FIG. 5A depicts a top view of top adapter 405. Note that the middle wall of top adapter 405 may be threaded so that it may be attached to shaft 115. Referring now to both FIG. 4 and FIG. 5B, FIG. 5B depicts a side view of top adapter 405. Top adapter 405 may attach to adapter shaft 410 via slotted area 505. Slotted area 505 may be installed by being fitted into adapter shaft 410, and subsequently twisting to lock top adapter 405 into the channels of adapter shaft 410. Referring now to both FIG. 4 and FIG. 5C, FIG. 5C depicts the bottom view of adapter shaft 410. Adapter shaft 410 may be slotted, and may contain channels to conform with top adapter 405, as described above.

Figure 6A:
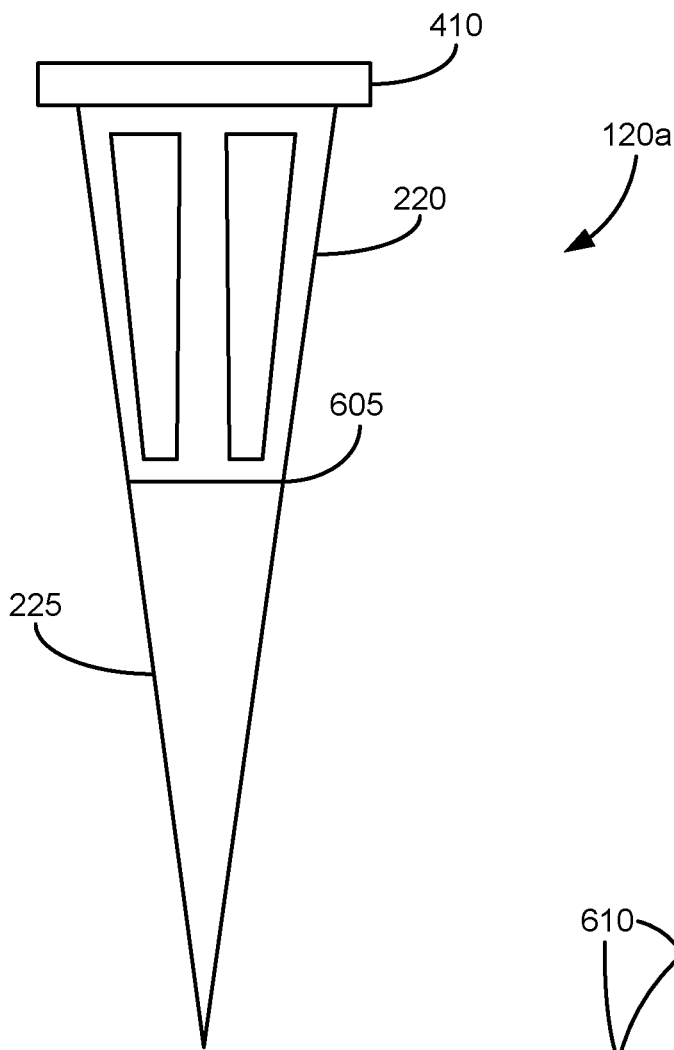
FIG. 6A-B are illustrations of an exemplary gardening utility device base, in accordance with an embodiment of the present invention.
Figure 6B:
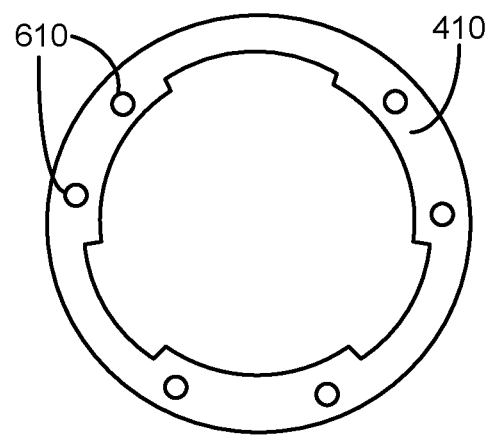

FIGS. 6A-B are illustrations of an exemplary gardening utility device base 120a, in accordance with an embodiment of the present invention. Referring now to both FIG. 2 and FIG. 6A, cartridge area 220 and stake 225 may be separated via interior ceiling 605. Note that cartridge area 220 may rest on interior ceiling 605. Referring now to both FIG. 4 and FIG. 6B, FIG. 6B depicts a top view of adapter shaft 410. Adapter shaft 410 preferably sits on top of the soil, and may include about three or more sets of staple holes 610. Staple holes may optionally be used to provide additional stability to garden utility device 100 by securing adapter shaft 410 into the soil using garden staples. In some embodiment, adapter shaft 410 may be threaded or tapered extensions. Other means of securing adapter shaft 410 may be used as well, such as, but not limited to, rebar, nail stakes, screw anchors, etc.

Figure 7:
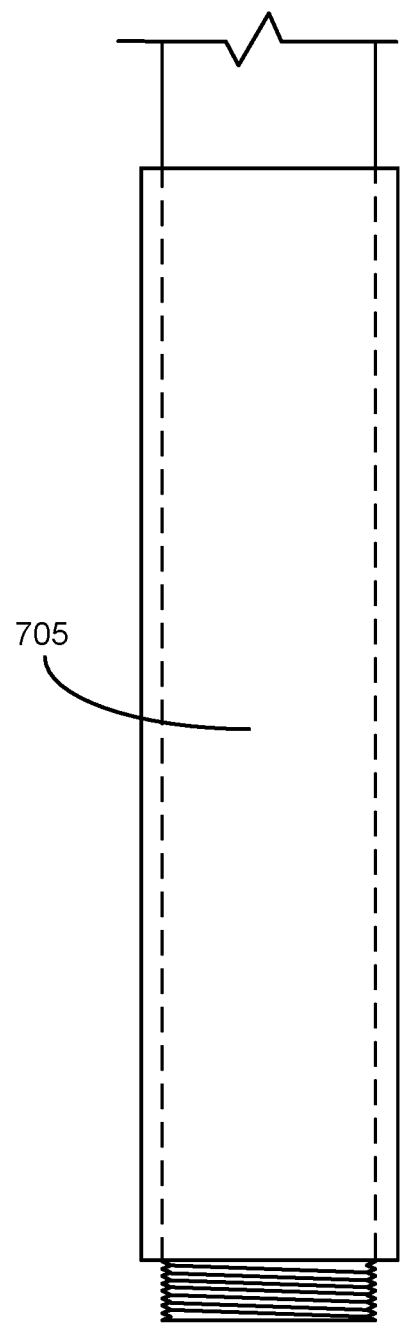
FIG. 7 is an illustration of an exemplary round plant shade adapter, in accordance with an embodiment of the present invention.

FIG. 7 is an illustration of an exemplary round plant shade adapter, in accordance with an embodiment of the present invention. Referring now to both FIG. 1 and FIG. 7, garden utility device 100 may optionally include adapters to be used with different sizes and shapes of plant shades. For example, without limitation, a plant shade with a round base and without threading may be attached to fertilizer base 120 of garden utility device 100 by utilizing round adapter 705. Round adapter 705 may be screwed into fertilizer base 120, and the shaft of a round plant shade may be inserted into round adapter 705.

Figure 8:
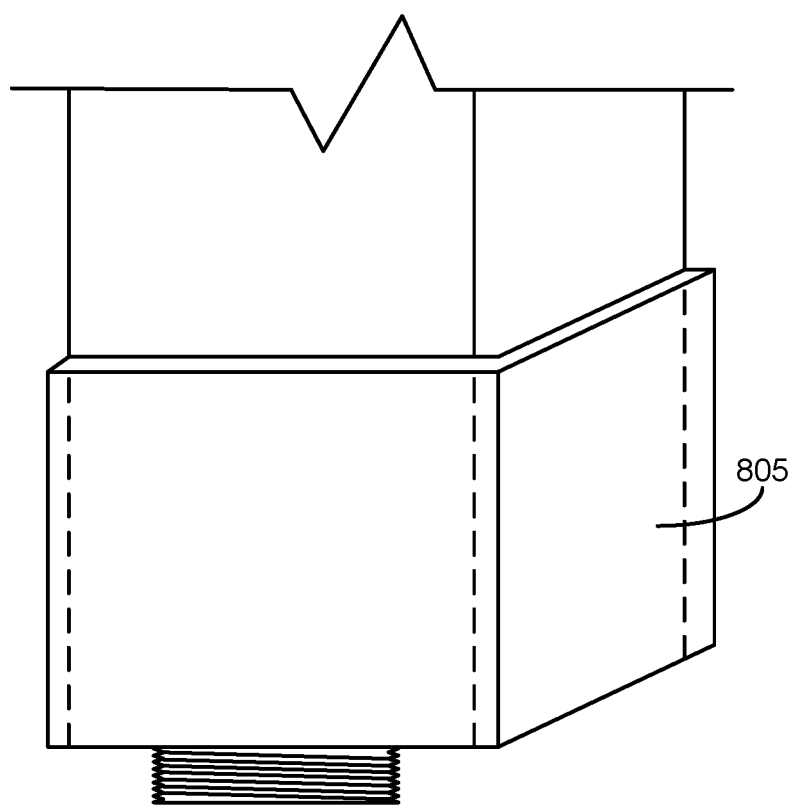
FIG. 8 is an illustration of an exemplary square plant shade adapter, in accordance with an embodiment of the present invention.

FIG. 8 is an illustration of an exemplary square plant shade adapter, in accordance with an embodiment of the present invention. Referring now to both FIG. 1 and FIG. 8, a plant shade with a square base and without threading may be attached to fertilizer base 120 of garden utility device 100 by utilizing square adapter 805. Square adapter 805 may be screwed into fertilizer base 120, and the shaft of a square plant shade may be inserted into square adapter 705.

Although FIG. 7 and FIG. 8 describe two alternative adapters that allow garden utility device 100 to be used with different plant shades, as will be appreciated by one skilled in the art, different shaped and sized adapters may be used as well to accommodate different styles of plant shades, and garden utility device 100 is not limited to being only used with plant shades with round or square shafts. For example, without limitation, a plant shade with an octagonal shaft may be used with garden utility device 100 by using an octagonal adapter.

Figure 9:
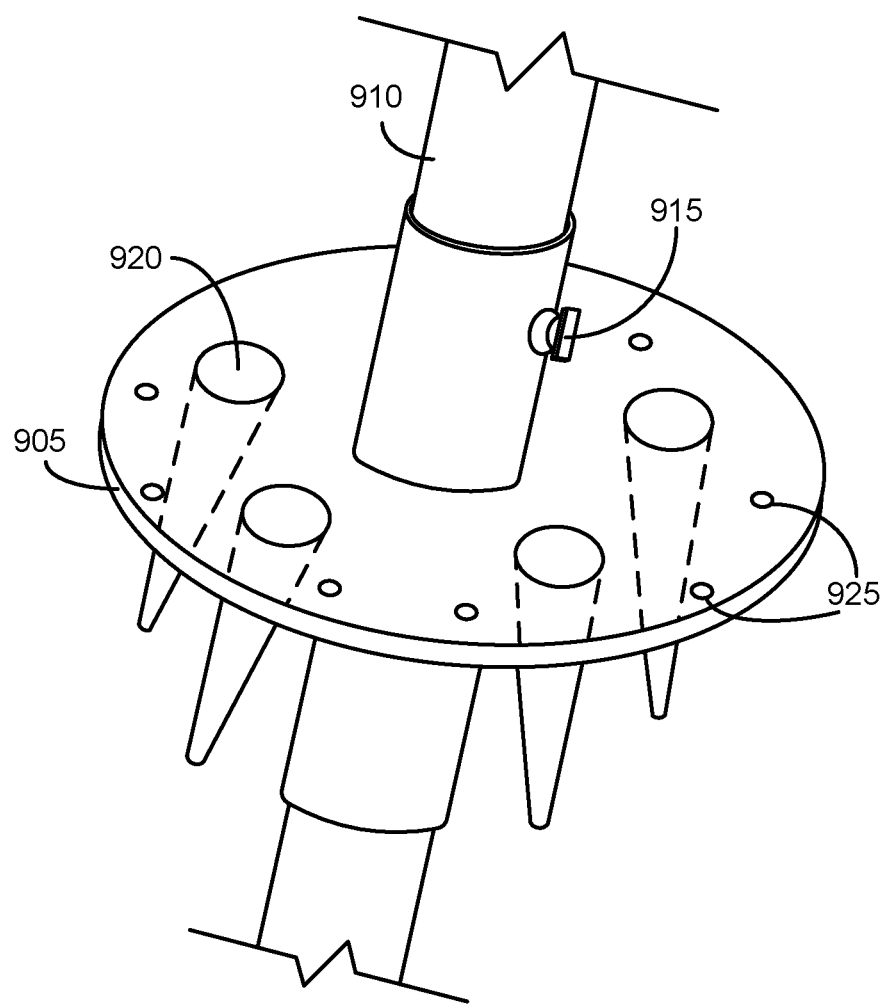
FIG. 9 is an illustration of an exemplary gardening utility device with multiple fertilizer spikes, in accordance with an embodiment of the present invention.

FIG. 9 is an illustration of an exemplary gardening utility device with multiple fertilizer spikes, in accordance with an embodiment of the present invention. In some cases, it may be desirable to utilize several fertilizer spikes in order to distribute the proper amount of nutrition throughout the surrounding soil. Fertilizer base 905 may be used to accommodate multiple fertilizer spikes 920 while still providing proper support for a plant shade 910. Fertilizer spikes 920 may be easily replaced, and may use a click and twist design for easy adjustment or refill of fertilizer. Plant shade 910 may be secured into fertilizer base 905 via set screw 915. Although plant shade 910 is depicted as being secured by set screw 915, alternative methods and adapters for securing plant shade 910 to fertilizer base 905 may also be used, such as, but not limited to, utilizing threading or adapters as illustrated in the previous embodiments. Garden staples may be utilized to add additional stability to fertilizer base 905 via staple holes 925. Although garden staples may be used to secure fertilizer base 905 into the soil, other means of securing fertilizer base 905 may be used as well, such as, but not limited to, rebar, nail stakes, screw stakes, anchors, etc.

Figure 10:
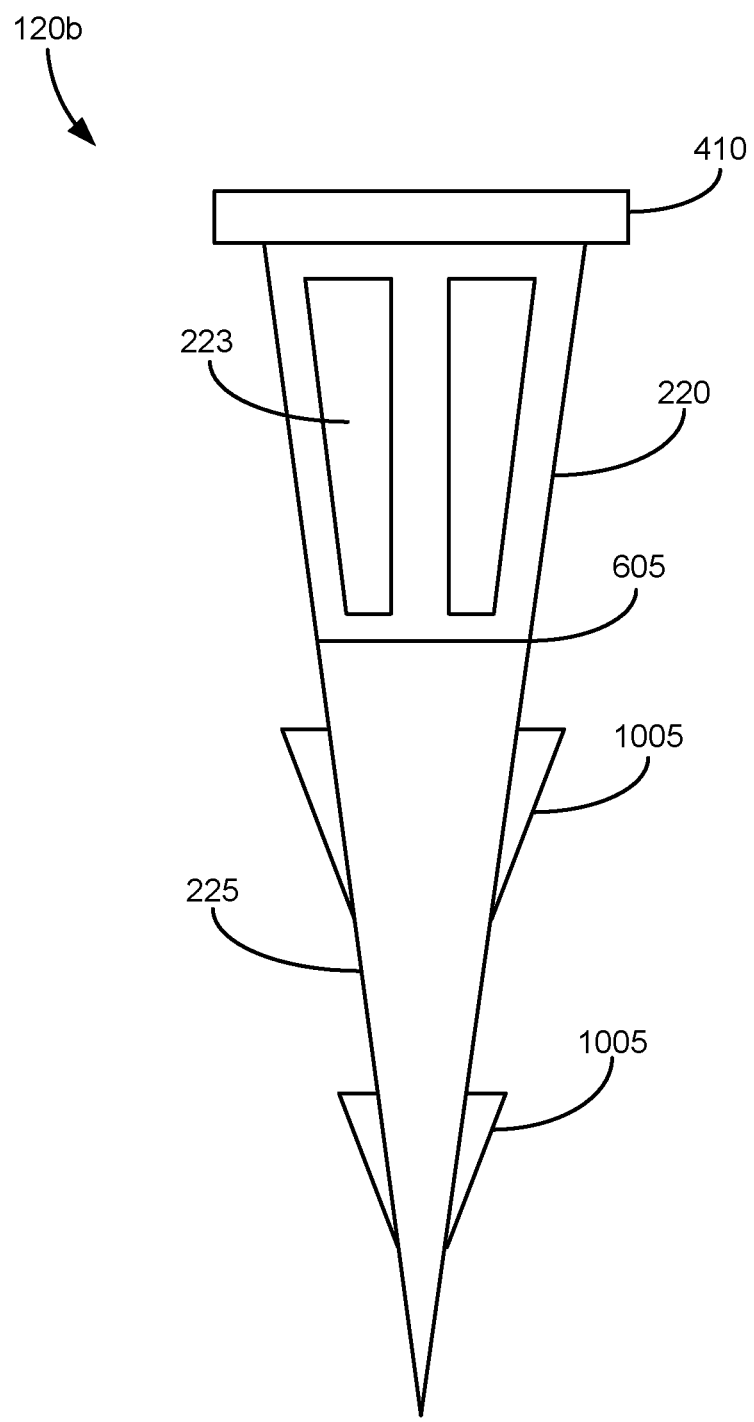
FIG. 10 is an illustration of an exemplary gardening utility device base, in accordance with an embodiment of the present invention.

FIG. 10 is an illustration of an exemplary gardening utility device base, in accordance with an embodiment of the present invention. In some embodiment of the device base 120b of the present invention, cartridge area 220 and stake 225 may be separated via interior ceiling 605. Stake 225 may include fletches 1005 for stability and/or to minimize rotational movement of the stake. Cartridge area 220 may rest on interior ceiling 605. Referring now to both FIG. 4 and FIG. 6B, adapter shaft 410 may sit on top of the soil and may prevent the fertilizer base from going deeper into the soil. In one embodiment, adapter shaft 410 may be used to control the depth cartridge area 220 is driven into the soil. Adapter shaft 410 may include staple holes 610. The staple holes may receive garden staples to provide additional stability to the garden utility device by securing adapter shaft 410 into the soil with the garden staples.

Figure 11:
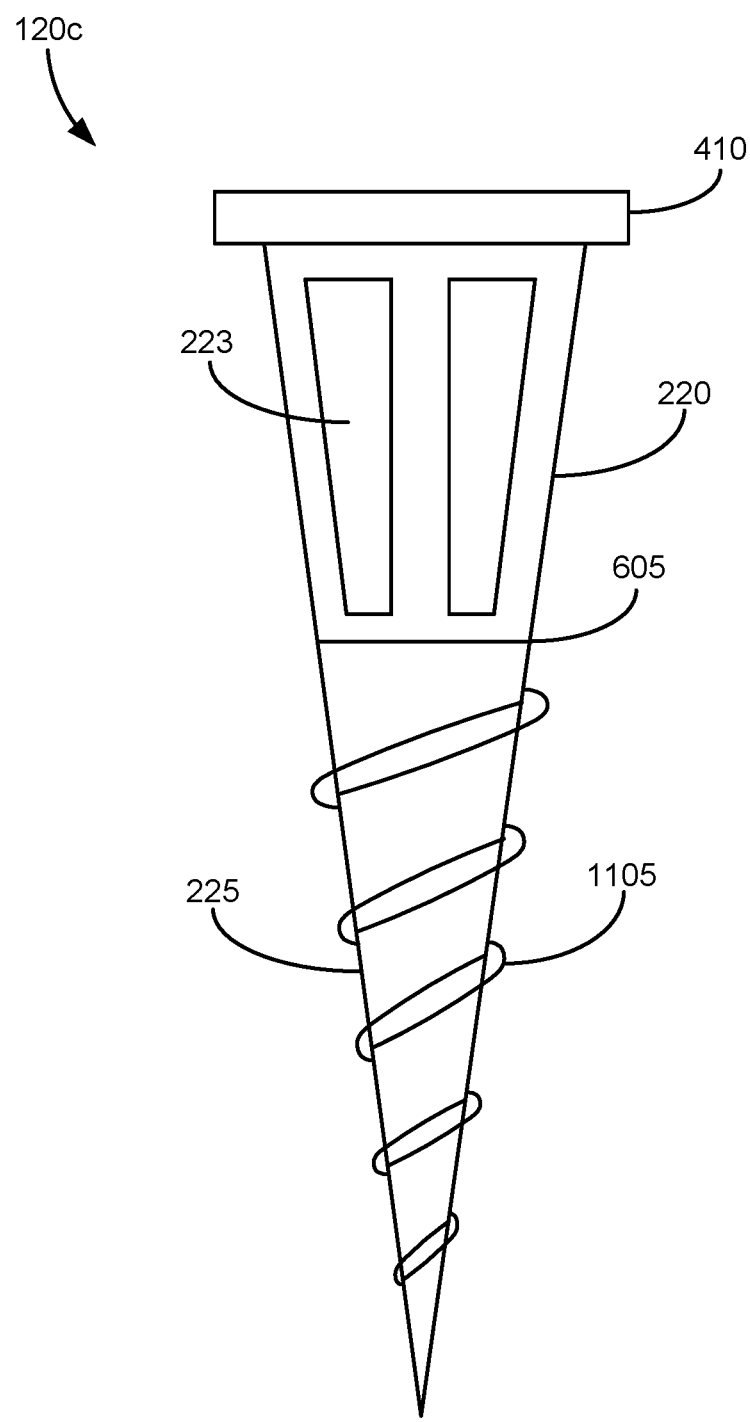
FIG. 11 is an illustration of an exemplary gardening utility device base, in accordance with an embodiment of the present invention.

FIG. 11 is an illustration of an exemplary gardening utility device base, in accordance with an embodiment of the present invention. In some embodiment of the device base 120c of the present invention, cartridge area 220 and stake 225 may be separated via interior ceiling 605. Stake 225 may include threads 1105 for ease of driving the stake in the soil and may provide stability to the device once the stake is driven into the ground. Cartridge area 220 may rest on interior ceiling 605. Referring now to both FIG. 4 and FIG. 6B, adapter shaft 410 preferably sits on top of the soil, and may include three sets of staple holes 610. Staple holes may optionally be used to provide additional stability to the garden utility device by securing adapter shaft 410 into the soil using garden staples. In other embodiments, adapter shaft 410 may be threaded or have tapered extensions. Device base 120c may comprise of, but not limited to, aluminum, fiberglass, steel, plastic, wood, etc.

Figure 12:
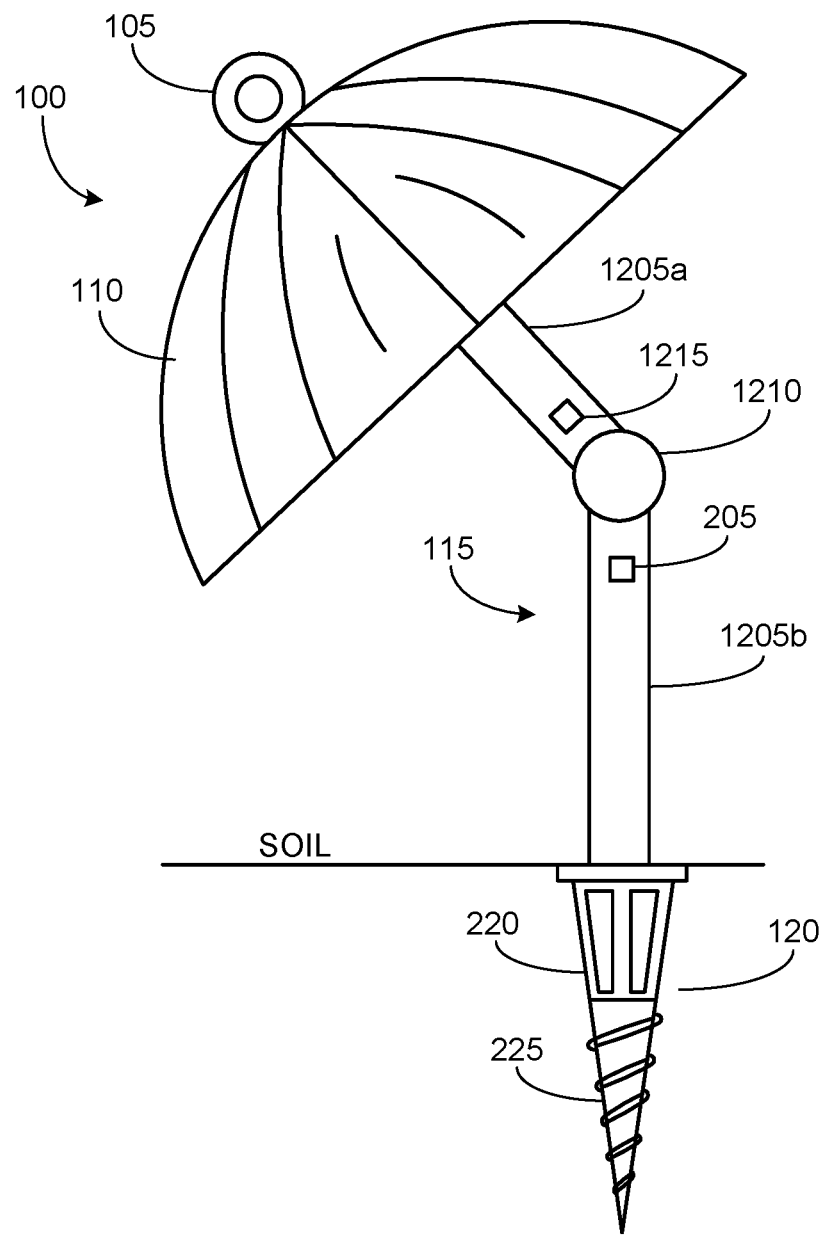
FIG. 12 is an illustration of an exemplary gardening utility device, in accordance with an embodiment of the present invention.

FIG. 12 is an illustration of an exemplary gardening utility device, in accordance with an embodiment of the present invention. Gardening utility device 100 comprises finger pull 105, collapsible or retractable umbrella 110, shaft 115, ball and socket joint 1210, and fertilizer base 120. Collapsible or retractable umbrella 110 may provide shade for a plant while the fertilizer base may provide nutrients to the plant. Shaft 115 may include upper shaft 1205a and lower shaft 1205b. Shaft 115 may provide support for collapsible/retractable umbrella 110, and may be attached to finger pull 105 and shade 110 at its top, and fertilizer base 120 at its bottom. Finger pull 105 above collapsible or retractable umbrella 110 may be attached to one end of upper shaft 1205a, and gives the user leverage while installing and uninstalling gardening utility device 100. Additionally, finger pull 105 may be twisted clockwise to expand collapsible or retractable umbrella 110, and likewise may be twisted counterclockwise to collapse umbrella 110. Collapsible or retractable umbrella 110 can be pushed up manually to provide shade or collapsed by manual depression of shaft button 1215 for storage. The other end of upper shaft 1205a may comprise of the ball while one end of the lower shaft 1205b may comprise of the socket joining the ball and vice versa where upper shaft 1205a may comprise of the socket while one end of the lower shaft 1205b may comprise of the ball joining the socket. Tilt button 205 is attached to shaft 1205b, and is used to tilt upper shaft 1205a according to the needs of the user. For example, without limitation, shaft 1205a may be tilted to provide partial or full shade to a plant proximal to its base according to the plant's required amount of sunlight. In some embodiment, collapsible/retractable umbrella 110 may be octagonal in shape, between 12"-36" in diameter, and made of a weather resistant and easily cleanable material such as polyester, vinyl or teflon. As will be appreciated by one skilled in the art, collapsible/retractable umbrella 110 may be of any shape including, but not limited to, circular, ovular, rectagonal, etc., be of any diameter, and composed of any material including, but not limited to, canvas, acrylic, olefin, etc. Further, shaft 115 may be telescopic to allow the user to adjust the height of the shade and store garden utility device 100 more conveniently. In some embodiment, referring to FIG. 2, if additional height is needed, shaft height extension 210 may be attached between lower shaft 1205b and fertilizer base 120. Shaft extension lock release button 213 provides a locking and releasing engagement of the shaft height extension. In one embodiment, shaft 115 may be conical in shape, between ⅜" and ½" in width, and may be composed of a sturdy, weather-resistant material such as aluminum. As will be appreciated by one skilled in the art, shaft 115 may be of any shape, such as, but not limited to, circular, rectangular, square-shaped, triangular, octagonal, etc., of any width, and of any material including, but not limited to, wood, steel, plastic, etc. Fertilizer base 120 may be attached to the other end of lower shaft 1205b, and may be inserted into the soil to both give stability to garden utility device 100 and deliver nutrients to the soil to aid in plant growth. In some embodiment, fertilizer base 120 may be composed of any sturdy, resistant material, such as steel. One skilled in the art will appreciate that fertilizer base 120 may be composed of any material, such as, but not limited to, aluminum, fiberglass, steel, plastic, wood, etc.

In some embodiment, referring to FIGS. 10 and 12, stake 225 at the end of fertilizer base 120 may comprise of fletches 1005 for stability and/or to minimize rotational movement of the stake. In another embodiment, referring to FIGS. 11 and 12, stake 225 at the end of fertilizer base 120 may comprise of fletches 1005 for stability and/or to minimize rotational movement of the stake. In another embodiment, referring to FIG. 11, stake 225 at the end of fertilizer base 120 may comprise of threads 1105 for ease of driving the stake in the soil and may provide stability to the device once the stake is driven into the ground. In yet another embodiment, referring to FIG. 11, stake 225 at the end of fertilizer base 120 may comprise of threads 1105 for ease of driving the stake in the soil and may provide stability to the device once the stake is driven into the ground. In another embodiment, referring to FIGS. 6 and 12, stake 225 at the end of fertilizer base 120 may not comprise of fletches or threads.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing the gardening utility device according to the present invention will be apparent to those skilled in the art. Various aspects of the invention have been described above by way of illustration, and the specific embodiments disclosed are not intended to limit the invention to the particular forms disclosed. The particular implementation of the gardening utility device may vary depending upon the particular context or application. By way of example, and not limitation, the gardening utility device described in the foregoing were principally directed to fertilization and shading implementations; however, similar techniques may instead be applied to deep root watering, fertilization systems and agricultural farming, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre AIA) or 35 USC 112(f) post-AIA. Otherwise, no limitations from the specification are to be read into any claims, unless those limitations are expressly included in the claims.

What is claimed is:

1. A device comprising:
   a fertilizer base that is configured to be operable for distributing fertilizer to a surrounding soil, said fertilizer base comprises;
   a stake implement, wherein said stake implement is configured to be operable for allowing said fertilizer base to be driven into the surrounding soil ground;
   a cartridge area, wherein said cartridge area is configured to hold the fertilizer to be delivered to the surrounding soil to aid in a plant's growth proximal said cartridge area, when said fertilizer base is driven into the surrounding soil ground; and
   an interior ceiling, wherein said interior ceiling is configured to separate said stake implement and said cartridge area;
   an umbrella, said umbrella comprises a collapsible or retractable umbrella, wherein said umbrella is into engagement with said fertilizer base, and wherein said umbrella is configured to provide shade for the plant;
   a shaft section, wherein a bottom portion of said shaft section engages said fertilizer base and said collapsible or retractable umbrella, in which said shaft section comprises a tilting shaft that is operable to be tilted to provide partial or full shade to the plant proximal to the fertilizer base according to a sun's orientation or the plant's required amount of sunlight; and an adapter coupling, wherein said adapter coupling is configured to facilitate the engagement or separation of said shaft section with said fertilizer base and allow a user to add fertilizer to said cartridge area without uninstalling the device.

2. The device of claim 1, in which said fertilizer base further comprises a threaded base portion that is configured to allow said shaft section to removably engage said fertilizer base, and allow the user to add fertilizer to said cartridge area without needing to completely uninstall the device.

3. The device of claim 2, further comprising a plurality of slots distributed around said cartridge area, wherein said plurality of slots are configured to facilitate the fertilizer contained in said cartridge area to be distributed to the surrounding soil.

4. The device of claim 3, further comprising a tilt button disposed on a portion of said shaft section, wherein said tilt button is configured to impart tilting of said shaft section.

5. The device of claim 4, further comprising a finger pull configured to give a user leverage while installing and uninstalling said device.

6. The device of claim 5, in which said finger pull is configured to expand the umbrella when twisted clockwise, and collapse the umbrella when twisted counterclockwise.

7. The device of claim 6, further comprising a shaft height extension, said shaft height extension is configured to be engaged between said shaft section and said fertilizer base to provide additional height.

8. The device of claim 7, further comprising shaft extension lock release button, said shaft extension lock release button is configured to provide a locking and releasing engagement of the shaft height extension.

9. The device of claim 6, in which said shaft section further comprises a telescoping shaft section that is configured to provide additional height.

10. The device of claim 5, further comprising an adapter shaft, wherein said adapter shaft is configured to engage said fertilizer base.

11. The device of claim 10, further comprising an adapter coupling in which said adapter coupling comprises a top adapter, wherein said top adapter is configured to engage a bottom portion of said shaft section.

12. The device of claim 11, in which said adapter coupling further comprises an adapter coupling slotted area, wherein said slotted area is configured to removably engage said adapter shaft.

13. The device of claim 12, in which said adapter shaft comprises an adapter shaft channel, in which said adapter shaft channel is configured to removably engage said adapter coupling slotted area.

14. The device of claim 13, in which said adapter shaft further comprises a plurality of staple holes, wherein said plurality of staple holes are configured to receive garden staples for securing said adapter shaft into the soil.

15. The device of claim 5, in which said cartridge area comprises multiple fertilizer spikes that are configured to hold and distribute fertilizer to the surrounding soil.

16. A device comprising:
means for distributing fertilizer to the surrounding soil, said fertilizer distributing means comprises:
means for driving said fertilizer distributing means into the surrounding soil ground;
means for holding and delivering the fertilizer into the surrounding soil ground; and
means for separating said driving means and said fertilizer holding means;
means for providing shade to a plant proximal to said fertilizer distributing means;
means for engaging said fertilizer distributing means and said shade providing means;
means for tilting said engaging means to provide partial or full shade to the plant proximal to the fertilizer base according to a sun's orientation or the plant's required amount of sunlight;
means for facilitating the engagement or separation of said shaft section with said fertilizer base and allow a user to add fertilizer to said cartridge area without uninstalling the device;
means for removably engaging said fertilizer distributing means and allow a user to add fertilizer to said fertilizer holding means without needing to completely uninstall the device;
means for allowing the fertilizer contained in said fertilizer holding means to be distributed to the surrounding soil; and
means for imparting a tilting of said engaging means.

17. A device comprising:
a fertilizer base, said fertilizer base is configured to be operable for distributing fertilizer to a surrounding soil, said fertilizer base comprises;
a stake implement, said stake implement is configured to be operable for allowing said fertilizer base to be driven into the surrounding soil ground;
a cartridge area, said cartridge area is configured to hold fertilizer to be delivered to the surrounding soil to aid in a plant's growth proximal to the cartridge area when said fertilizer base is driven into said soil ground, in which a plurality of slots distributed around said cartridge area are configured to allow the fertilizer contained in said cartridge area to be distributed to the surrounding soil; and
an interior ceiling, said interior ceiling is configured to separate said stake implement and cartridge area;
an umbrella, wherein said umbrella is configured to provide shade for the plant, in which said umbrella comprises a collapsible or retractable umbrella, and wherein said umbrella is into engagement with said fertilizer base;
a shaft section, wherein a bottom portion of said shaft section engages said fertilizer base and said collapsible or retractable umbrella, in which said shaft section comprises a tilting shaft that is operable to be tilted to provide partial or full shade to the plant proximal to the fertilizer base according to a sun's orientation or the plant's required amount of sunlight;
an adapter coupling, wherein said adapter coupling is configured to facilitate the engagement or separation of said shaft section with said fertilizer base and allow a user to add fertilizer to said cartridge area without uninstalling the device;
in which said fertilizer base further comprises a threaded base portion that is configured to allow said shaft section to removably engage said fertilizer base, and allow the user to add fertilizer to said cartridge area without needing to completely uninstall the device; and
a tilt button disposed on a portion of said shaft section, wherein said tilt button is configured to impart tilting of said shaft part.

18. The device of claim 17, further comprising a finger pull configured to give a user leverage while installing and uninstalling said device, in which said finger pull is configured to expand the umbrella when twisted clockwise, and collapse the umbrella when twisted counterclockwise.

19. The device of claim 18, further comprising a shaft height extension engaged between said shaft section and said fertilizer base to provide additional height and a shaft extension lock release button that is configured to provide a locking and releasing engagement of said shaft height extension.

20. The device of claim 19, further comprising an adapter shaft that is configured to engage said fertilizer base and an adapter coupling having a top adapter that is configured to engage a bottom portion of said shaft section, wherein said adapter shaft is removably engageable with said adapter coupling.

* * * * *